(12) United States Patent
Edwards

(10) Patent No.: US 8,850,394 B2
(45) Date of Patent: Sep. 30, 2014

(54) DEBUGGING SYSTEM AND METHOD

(75) Inventor: David Alan Edwards, Bristol (GB)

(73) Assignee: Icera Inc., Wilmington, DE (US)

( * ) Notice: Subject to any disclaimer, the term of this patent is extended or adjusted under 35 U.S.C. 154(b) by 957 days.

(21) Appl. No.: 12/437,081

(22) Filed: May 7, 2009

(65) Prior Publication Data

US 2009/0282294 A1 Nov. 12, 2009

(30) Foreign Application Priority Data

May 8, 2008 (GB) .................................. 0808360.2

(51) Int. Cl.
G06F 9/44 (2006.01)
G06F 11/00 (2006.01)
G06F 19/00 (2011.01)
G06F 11/36 (2006.01)

(52) U.S. Cl.
CPC .................................. G06F 11/3636 (2013.01)
USPC .............................. 717/124; 714/45; 702/125

(58) Field of Classification Search
USPC ................ 714/45, 50; 717/124, 151
See application file for complete search history.

(56) References Cited

U.S. PATENT DOCUMENTS

| | | | |
|---|---|---|---|
| 4,937,740 A | | 6/1990 | Agarwal et al. |
| 5,535,331 A * | | 7/1996 | Swoboda et al. ............... 714/45 |
| 5,790,840 A | | 8/1998 | Bulka et al. |
| 5,930,470 A * | | 7/1999 | Noguchi et al. ........... 714/38.13 |
| 6,615,166 B1 * | | 9/2003 | Guheen et al. .................. 703/27 |
| 6,732,307 B1 | | 5/2004 | Edwards |
| 7,031,869 B2 * | | 4/2006 | Litt et al. ....................... 702/125 |
| 7,437,619 B2 * | | 10/2008 | McCullough et al. .......... 714/45 |
| 7,644,319 B2 * | | 1/2010 | Thekkath ........................ 714/45 |
| 7,739,668 B2 * | | 6/2010 | Cruickshank et al. ........ 717/128 |
| 7,814,308 B2 * | | 10/2010 | Templin et al. ................ 713/152 |
| 7,823,135 B2 * | | 10/2010 | Horning et al. ................ 717/127 |
| 7,870,437 B2 * | | 1/2011 | Swaine et al. ................... 714/45 |
| 8,001,427 B2 * | | 8/2011 | Sohm et al. ..................... 714/45 |
| 2007/0239972 A1 | | 10/2007 | Orita et al. |

FOREIGN PATENT DOCUMENTS

| | | |
|---|---|---|
| EP | 1089187 | 4/2001 |
| GB | 0808360.2 | 7/2009 |

OTHER PUBLICATIONS

Bart Vermeulen, "Functional Debug Techniques for Embedded Systems," IEEE Design & Test of Computers, May 2008, pp. 208-215.

* cited by examiner

Primary Examiner — Don Wong
Assistant Examiner — Mohammad Kabir

(57) ABSTRACT

A method and processor for debugging a target processor. The method comprises: executing code on the target processor to generate trace information for debugging; and during execution of that code, periodically incrementing a value of a counter on the target processor. The execution of the code includes executing a plurality of timestamp instructions on the target processor each to associate a respective timestamp with the trace information. The execution of each timestamp instruction comprises generating the respective timestamp by reading the value of the counter into a software accessible storage location and subsequently resetting the counter.

24 Claims, 2 Drawing Sheets

DEBUGGING SYSTEM AND METHOD

PRIORITY CLAIM

The present application claims the priority of United Kingdom Patent Application No. GB 0808360.2 filed May 8, 2008.

FIELD OF THE INVENTION

The present invention relates to a system and method for providing timestamps in relation to debugging events.

BACKGROUND OF THE INVENTION

When debugging or optimizing software, it is useful to understand its timing-related behaviour (e.g. how much time was spent executing each function, each thread, or perhaps how long was spent between multiple arbitrary points in a program). This allows the software developer to decide where to focus their attention in order to improve the runtime or efficiency of their software. It also allows the hardware designer to understand the "whole system" effect of programs running with complex real-time peripherals, data sources etc. so that they can improve designs of future systems.

These debugging and optimization activities are typically performed using a debugger or profiler tool (henceforth referred to as "Debug Tool") which extracts information from the software (henceforth referred to as "debugee") executing on the target hardware (henceforth referred to as "target"). The target is typically an embedded device such as a mobile phone, set top box, or engine management system.

"Debug Tools" are typically implemented as either fully target-based tools or host-target tools.

Fully target-based means the debug tool executes on the same target as the debugee, i.e. all the debugging or profiling information is gathered and displayed by software running on the target. A problem with fully target-based tools is that they are typically limited by the resources available on the target system (e.g. spare memory, spare MHz required to run the debug tool, method to accept input such as keyboard, and display output such as a graphical or text display). Further, the target-based tool can perturb the debugee running on the target, i.e. such that the act of observation actually affects that which is being observed. Nonetheless, target-based tools can be useful for final "deeply embedded" test situations.

Host-target tools (sometimes referred to as "Cross development Debug Tools") refers to tools whereby a host computer (such as a Linux or Windows based PC system) executes the main part of the debug tool and communicates with the target system which is executing the debugee to obtain debugging or profiling information. In this case the host is typically connected to the target (typically an embedded system such as a mobile phone or Set Top Box, or engine management system) by a debug link (such as a JTAG port, or NEXUS 5001 AUX port). However it can also be connected by other non-debug specific means (e.g. serial port, USB port, shared memory etc.).

Host target based tools are the most appropriate to debug and profile hard-real-time and embedded systems as the debug tool executes on a separate computer system and thus is not limited by the resources available on the target system (e.g. a PC typically provides a large amount of virtual memory, hard disc file storage and Ethernet support, whereas a mobile phone typically does not). Additionally, operation of the Debug Tool (e.g. redrawing a GUI, or processing information) does not perturb the debugee as the target is not involved.

Some of the typical timing-observation features provided in debug tools allow the software developer to: measure time spent in each function in the debugee, measure time between arbitrary points in the debugee, measure time spent in each thread in an RTOS-based debugee, and/or measure time spent when IDLE in an RTOS-based debugee.

The resolution of the timestamps required depends on the activity being performed. For example when performing high-level analysis of time spent in individual function(s) in the program, then "system time" (i.e. μSecs or mSec) timing resolution is acceptable. But for other activities (e.g. in depth analysis of a program executing on a CPU and its interaction with caches/memory systems/peripherals etc.), then full CPU-frequency timing-resolution is desirable.

Timestamps can either be generated implicitly or explicitly when trace information is generated, or they can be added by the debug tool when it receives the trace information. Examples of the use of timestamps in debugging can be found in U.S. Pat. No. 5,790,840 and US application no. 2007/0239972.

Although host-target based tools are more appropriate to hard-real-time and embedded systems as mentioned above, there are also problems in that the time-stamping functionality and/or resolution may be limited.

Thus it can be seen that when trying to implement a debugging tool there is a problem in balancing the functionality of the debugging tool and the resolution of the time-stamping against the perturbance to the debugee and the availability of resources of the target.

SUMMARY

According to one aspect of the present invention, there is provided a method of debugging a target processor, the method comprising: executing code on the target processor to generate trace information for debugging; and during execution of said code, periodically incrementing a value of a counter on the target processor; wherein the execution of said code includes executing a plurality of timestamp instructions on the target processor each to associate a respective timestamp with said trace information, the execution of each timestamp instruction comprising generating the respective timestamp by reading the value of the counter into a software accessible storage location and subsequently resetting the counter.

As the timestamp value is obtained by the debugee, it can be used by the debugee directly to achieve effects that could not be achieved if a host debugging tool added the timestamp. But at the same time, the implicit resetting reduces the effect of limited target resources and the perturbance to the debugee caused by the timestamping process. The implicit resetting has a number of advantages in this respect. Firstly, only two target instructions are required to measure the time between two events, regardless of whether that time is needed on the target itself or off-chip on a host, because the implicit resetting means that the value of the later timestamp is equal to the time since the earlier timestamp and so no subtraction of timestamp values is required. Secondly, timestamp values tend to be smaller in magnitude and therefore may be more readily compressed, requiring less space on the target and/or less bandwidth for transmission from the target to a host (the bandwidth of the debug port may be limited). And thirdly, the counter value can be reset without an extra instruction and corresponding mechanism to do so, thus reducing the debugging mechanism's impact on the instruction set (which may be limited) and on the amount of logic required.

The reading of the value into a storage location may comprise reading the value from the counter into a timestamp register and subsequently reading the value from the timestamp register into a destination storage location. The timestamp register may be implicit in the timestamp instruction.

The method may further comprise, for at least one of the timestamps: retrieving the timestamp from the storage location, and supplying the retrieved timestamp or information based thereon to a debugging tool. The step of supplying may comprise supplying the retrieved timestamp or information based thereon from the target processor to a host debugging tool running an external computer system. The step of supplying may comprise supplying the retrieved timestamp or information based thereon to a target-based debugging tool running on the target processor itself. Said retrieval of the timestamp may be performed by software executed on the target processor.

The method may comprise compressing the timestamp by omitting leading zeros.

The method may comprise filtering one or more timestamp instructions by selecting a mode of operation of the processor in which timestamp instructions do not reset the counter.

The method may comprise using the timestamp as a measure of one of: a time between arbitrary specified points in said code, a time spent in a function of said code, a time spent executing each of a plurality of threads in said code, and a time spent when idle.

The method may comprise processing the timestamp to be supplied in software executed on the target processor to generate said information based thereon, wherein the step of supplying comprises supplying said information to the host debugging tool.

According to another aspect of the invention, there is provided a processor for generating debugging timestamps, the processor comprising: a program memory; an execution unit operatively coupled to said program memory, arranged to execute code fetched from said memory to generate trace information for debugging; a counter operatively coupled to the execution unit, arranged to periodically increment during execution of said code; and a software-accessible storage location operatively coupled to the execution unit; wherein the execution unit is configured to, upon execution of each one of a plurality of timestamp instructions in said code, associate a respective timestamp with said trace information by reading the value of the counter into the storage location and subsequently resetting the counter.

According to other aspects of the present invention, there are also provided a user equipment, mobile terminal, set-top box and engine management system comprising such a processor.

BRIEF DESCRIPTION OF THE DRAWINGS

For a better understanding of the present invention and to show how it may be carried into effect, reference will now be made by way of example to the accompanying drawings in which.

DETAILED DESCRIPTION OF THE PREFERRED EMBODIMENTS

Figure 1:
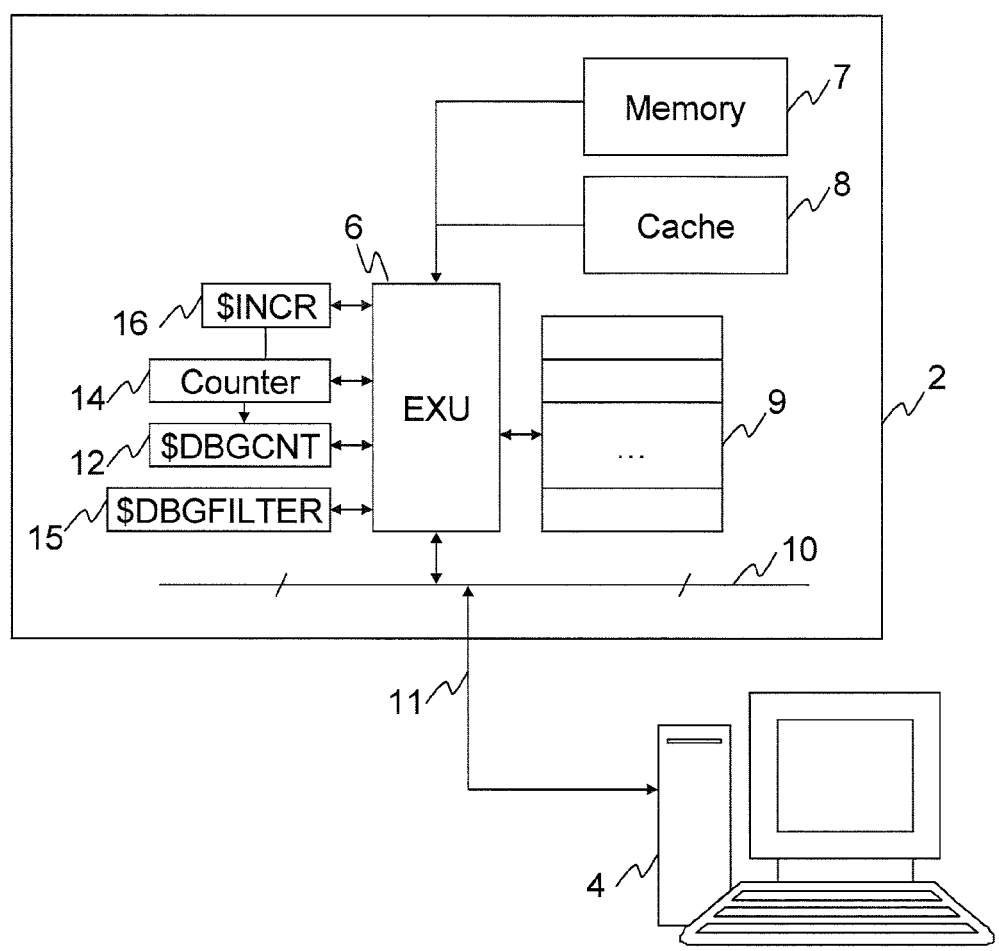
FIG. 1 is a schematic representation of a debugging system.

As mentioned, fully target-based debugging tools are limited by the resources of the target and tend to have a perturbing effect on the debugee software which they are supposed to be passively observing. Host-target based tools are more appropriate to hard-real-time and embedded systems as mentioned above, but their time-stamping functionality and/or resolution may be limited. The inventor has made the following analysis of the difficulties with such tools.

Techniques which involve the debug tool adding timestamps when it receives trace information are undesirable for the following reasons. Timestamp values are not available for use in fully target-based debug tools as the target (and thus the debugee) is not able to access the timestamp value and so certain features are not implementable. Similarly, timestamps are not available for some purposes in host/target debug tools (e.g. as the RTOS has no access to the timestamp generated by the debug tool it cannot obtain measurements such as "time" spent when IDLE in RTOS-based debugees)—in this circumstance the debug tool would have to gather a huge amount of additional trace information, timestamp it, and analyze it in order to calculate IDLE time. Further, timestamps would typically be of low-resolution, e.g. if the timestamp is added by the debug tool itself, rather than using the actual CPU clock frequency it is likely to be added with less accuracy due to the debug tool running on a lower-frequency target than the target CPU. Additionally there is usually "slippage" of the time between when the target/debuggee generates trace information and the time at which the debug tool obtains it (e.g. non-deterministic delays thru on-chip interconnects, external debug link etc.).

Thus it is often more desirable if the target (i.e. the debugee) can generate the timestamps itself—this allows use of this information for a number of purposes (e.g. processing them to generate RTOS IDLE times, storing them memory together with other data structures to make arbitrarily complex trace logs, or outputting them with specific items of debug/trace information on some form of debug link such as a JTAG or NEXUS AUX port, or a serial or USB port).

Typical methods whereby the debugee generates the timestamps itself involve: the target having some form of debug link (e.g. JTAG port, or NEXUS AUX port), or "instrumenting" the debugee by the inclusion of additional instructions to obtain timing information and to make it available to the debugger/profiler tool.

Where the target has a debug link such as a JTAG port or NEXUS AUX port, there are standard methods by which the debug port itself adds timestamp information when generating trace information. However, these methods also have associated problems. These methods can function well, but do not provide full functionality (i.e. ability for the debugee to measure time itself) as the timestamp values are issued on the debug link, rather than being available to the application. Additionally, methods are usually provided to encode the timestamp in an efficient manner. This is usually a timestamp-specific compression method involving a large number of trace messages. For example, the NEXUS 5001 standard (2003) provides timestamping as an option, and it may be implemented in a manner requiring additional pin(s) or via special messages. This involves a fixed hardware overhead and also means that all such debug link messages will include timestamp information even if it is not required for certain messages.

On the other hand, there is "instrumenting" the debuggee by the inclusion, in the debugee code itself, of additional instructions to obtain timing information and to make that information available to the debugger/profiler tool. This "instrumentation" typically consists of routines such as:

unsigned int timeValue=obtainTimestamp( );

which returns the current time value, typically obtained by a sequence of instructions to read a SoC based timer—this requires a number of instructions (e.g. several instructions to form an address, an instruction to read the address, and use of CPU register(s) to hold the address and value read); and outputTimestamp (timeValue);

which informs the debugger/profiler tool of the timestamp (by some unspecified method, which could include a NEXUS-style DQM (Data acQuisition Message) mechanism either recording information to memory, or outputting it on a debug link. The debugee does not need to output all timestamp values—it could just obtain them and use them for its own purposes (e.g. in a memory based trace, or when calculating IDLE time etc.).

This "instrumentation" is typically included in the debugee either by: the software developer explicitly inserting such instructions, macros or calls to functions to implement them; the compiler (or linker) implicitly inserting such instructions or calls to functions to implement them; or libraries (e.g. RTOS, C runtime etc.) being instrumented using one of these techniques.

The "instrumentation" is ideally single (or small numbers of) instructions—if it is much larger than this it can increase the size of the debugee such that it no longer fits in the restricted memory environment typically available in embedded targets.

The problems with instrumentation are as follows. If the "instrumentation" consists of moderate or large numbers of instructions, or function calls to sequences of instructions, the behaviour of the debugee is affected in an undesirable manner. If a moderate or large sequence of instructions is required they will affect the operation of the CPU's instruction cache in comparison to its operation in the non-instrumented version of the debuggee. If a moderate or large sequence of instructions is required they will typically require access to a number of CPU register(s) and so the compiler's register allocation strategy will be influenced by the inclusion of the instrumentation instructions. Further, the execution of the instructions or a function call to a sequence of instructions alters the CPU's cache behaviour and/or its branch prediction mechanism.

Thus typical implementations of the instrumentation can affect the behaviour of the debuggee, such that the process of observing the debugee materially alters its behaviour.

It would be advantageous to alleviate the difficulty in balancing the various considerations discussed above.

FIG. 1 schematically illustrates a debugging system comprising a target processor 2 coupled to a host computer system 4. The target processor comprises an execution unit 6, instruction memory 7 and instruction cache 8, a system interconnect 10 such as a bus, an incremental counter 14, a timestamp register 12 ($DBGCNT) for holding a count value, and one or more destination registers 9. The execution unit is operatively coupled to the instruction memory 7, instruction cache 8, counter 14, timestamp register 12, and destination registers 9; and the counter 14 is operatively coupled to the timestamp register 12. The target processor could be for example that of a mobile phone, set top box, or engine management system. The external host computer system 4 is operatively coupled to the execution unit 6 via the system interconnect 10 and a debug link 11 such as a NEXUS or JTAG port. The counter 14 may be a dedicated debug counter.

In operation, the execution unit 6 fetches and executes instructions from the instruction memory 7 or instruction cache 8, which contains the debugee code. As well as the actual code to be debugged, the debugee code comprises instrumented debugging instructions including timestamp instructions to generate timestamps. The code in the memory 7 or cache 8 could be provided from any suitable source, e.g. an external flash memory (not shown). The execution of the debugee results in trace information, which can be any information relevant for debugging purposes, e.g. information relating to events such as arbitrary specified points in the debugee code, the start or end or particular event within a particular function, and/or the start or end of a thread in a real-time operating system (RTOS) based debugee. The trace information is output to the host computer system 4 for whatever analysis the user desires. During execution of the debugee code, the counter 14 increments its counter value periodically. To give maximum timestamp resolution the counter 12 should be incremented at each processor clock cycle, but it could be incremented less frequently.

Further, the execution unit 6 is configured to have a special behaviour upon execution of an instrumented timestamp instruction. That is, the single timestamp instruction both implicitly causes the current count value in the counter 14 to be transferred into the timestamp register 12 ($DBGCNT), and implicitly then resets the counter to zero.

To elaborate, executing a timestamp instruction will transfer the current time value of the counter 14 into the timestamp register 12 ($DBGCNT), and then transfer this value from the timestamp register 12 ($DBGCNT) to a destination location specified in the operand of the timestamp instruction. The destination is preferably one of the destination registers 9 which are accessible to software, but could be some other memory location. The same timestamp instruction will then reset the counter 14 to zero. All of these steps are preferably the result of the execution of a single timestamp instruction, and all happen in the same cycle of the execution unit 6.

The timestamp register 12 ($DBGCNT) is preferably implicit in the timestamp instruction. That is to say, the fact of using that particular register 12 to transfer the time value into from the counter 14 is encoded into the binary encoding of the timestamp instruction opcode, rather than an operand. The execution unit 6 is configured to automatically use that register 12 to transfer the time value into from the counter 14 upon executing that opcode. Or put another way, the identity of the timestamp register 12 is predetermined for that opcode. Thus the timestamp instruction preferably only needs a single operand, which is to identify the destination location 9, and does not require an operand to specify the timestamp register 12. The identity or location of the timestamp register 12 ($DBGCNT) does not need to be given explicitly in the timestamp instruction. The timestamp register 12 is preferably not memory-mapped.

Further, the resetting of the counter 14 is implicit in that same timestamp instruction. That is to say, the act of resetting the counter is encoded into the binary encoding of the timestamp instruction opcode. The execution unit 6 is configured to automatically reset the counter 14 upon executing that opcode.

This implicit functionality of the timestamp instruction could be hardwired into the execution unit 6 or could be implemented by a "soft" instruction set whereby the execution unit 6 refers to a look-up table for instruction definitions. Either way, the execution unit is configured such that: (i) the identity of the timestamp register 12 does not need to be specified in the timestamp instruction, and (ii) the timestamp instruction will zero the counter automatically, i.e. without the need for any further instruction.

Once the timestamp has been read into the destination location, it can be used for whatever debugging purpose is required, such as for tracking down or analyzing errors in the debugee or optimizing the debugee. This could be performed on the target 2 and/or the host 4. The target 2 may read the timestamp from the destination location and use it for whatever purpose it sees fit (e.g. for RTOS IDLE time calculation), or send it to the host using DQM or some such method. Or the host 4 may read the timestamp from the destination location, for example if the destination location is a first-in-first-out (FIFO) buffer mechanism then the host 4 could read the timestamp without any further involvement of the target 2 in that respect.

Figure 2:
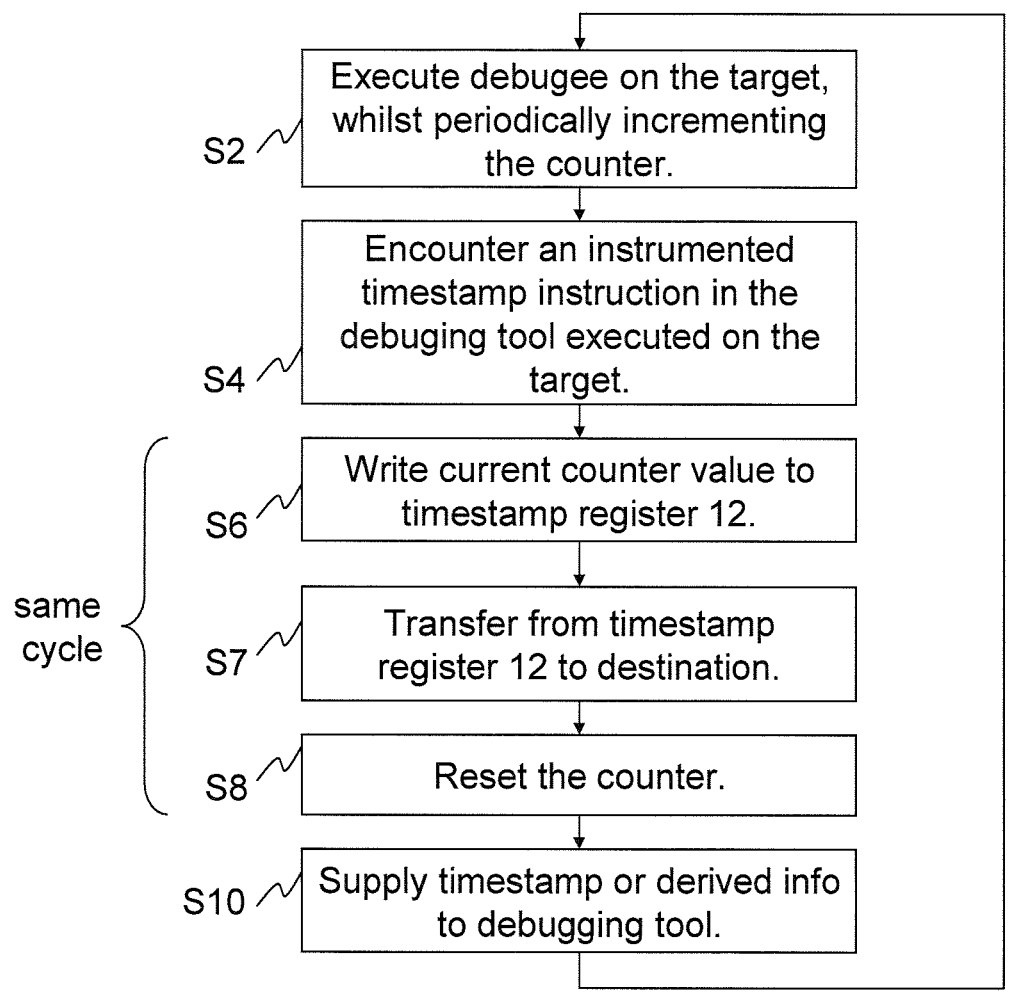
FIG. 2 is a flow chart of a debugging method.

This method is shown in the flow chart of FIG. 2. At step S2, the target executes the debugee code whilst incrementing the counter 14. At step S4, the target encounters an instrumented timestamp instruction in the debugee code. As a result, at step S6 the execution unit 6 acts to cause the current counter value to be written from the counter 14 to the timestamp register 12 thus creating a timestamp, at step S7 the execution unit acts to cause the timestamp to be transferred from the timestamp register 12 to the destination specified in the timestamp instruction's operand, and at step S8 the execution unit resets the counter 14. All of steps S6, S7 and S8 are performed in the same execution cycle, as a result of the same timestamp instruction, and steps S6 and S8 are both implicit in that timestamp instruction. At step S10, either the timestamp or other information produced by the debugee code using the timestamp is supplied to the debugging tool, in this case on the host computer 4. The method then returns to step S2 where it the target 2 continues running other debugee code until in encounters another timestamp instruction, etc.

The advantages of this system and method are now set out below.

The fact that use of a specific register 12 is implicit in the instruction to read the counter 14 is advantageous because it means that fewer instructions are required to read the counter. A single instruction is able to read the timestamp value by specifying the timestamp source register 12 implicitly. Thus a single instruction is required, with a single destination register used to hold the timestamp value. Due to the single instruction, and single register requirement, timestamp values can easily be used to instrument the debugee without significantly affecting the code size, register allocation, or execution behaviour (caching, branching etc.). Thus such instructions can easily be automatically inserted by a compiler or linker. They can also easily be inserted by a programmer in order to instrument specific points of interest. They can also easily be incorporated within libraries (e.g. RTOS instrumentation). They can also easily be used within libraries (e.g. RTOS IDLE time measurement etc.).

Further, as the timestamp value is obtained by the debugee, it can be used by the debugee directly to achieve effects not possible if the Debug Tool added the timestamp. For example it can be used to calculate timing information such as IDLE time within the debugee or target-based debug agent rather than having to pass all timestamp values to the hosted debug tool.

In addition, the instruction to read the timestamp counter zeros the timestamp counter following each read operation. Thus the time value returned reflects the amount of time passed since the previous read. Further, it is not necessary to provide a mechanism to write to the timestamp counter. This means only a single timestamp instruction is required to read the time since the last timestamp and thus to measure the time between two events. By reducing the number of instructions required, the perturbation by the debugging process on the debugee is reduced, i.e. the effect of the act of observation on that being observed is reduced.

Further, frequently read timestamp values are smaller in magnitude as they reflect the delta between read operations, and thus easily compressed (by omitting leading zeros). A suitable hardware compression mechanism used for normal data values (i.e. omitting leading zeros) can be re-used for timestamp values. This particularly benefits from the counter zeroing on each read as it reduces the magnitude of the values typically read.

Another advantage is that only a small amount of additional hardware is required to implement the mechanism.

In embodiments, filtering means may be provided on the target 2 to "filter" the debugging behaviour, including by preventing the resetting effect of instrumented timestamp instructions. The filtering means could comprise circuitry such as a register for controlling the filtering, e.g. a one-bit, software-accessible register 15 ($DBGFILTER) coupled to the execution unit 6 for toggling the debugging on and off. In that case, the execution unit 6 is configured such that when $DBGFILTER is toggled on, it will still write the value of the counter 14 to the timestamp register 12 ($DBGCNT) but it will not reset the counter 14. When $DBGFILTER is toggled off, the execution unit executes the timestamp instructions normally in the manner described above.

This feature can advantageously be used to prevent debug/trace information which is not of interest, and/or is non-deterministic, from interfering with normal deterministic timestamp behaviour. For example, this could be useful when "profiling" a program (to obtain timing information in order to understand its behaviour and then optimize it). E.g. a test framework for a voice codec will typically include code to read a test datafile from the host's file system. The amount of time taken to read this file is non-deterministic as it involves the host, its filesystem, and perhaps also a network, etc. That amount of time also isn't really of interest when examining the performance of the codec itself. Thus in such circumstances it would be useful to "throw away" the time spent in such routines.

Because the counter 14 is not reset while the filtering is turned on, then the timestamp value read into the timestamp register 12 ($DBGCNT) can if desired be discarded or ignored without any loss of timing information—the time since the preceding event is still given by the value in the counter. Or put another way, when the filtering is turned on then the timestamp instructions have a non-destructive effect. This means that timestamps of irrelevant or uninteresting events between two points can be discarded or ignored whilst still maintaining the timing between those two points.

Some further details of the preferred embodiments are described below, as well as an example of how the implicit zeroing mechanism results in fewer instrumentation instructions in the debugee (and therefore reduces perturbance).

As explained, the processor provides a register ($DBGCNT) which holds a count value. This value is generated by a counter, whose increment method is predetermined. $DBGCNT provides read-only access to the counter's current value. It is not necessary to provide write access to the counter or $DBGCNT register.

The increment method could be fixed in some implementations, or could be controllable by providing a register 16 ($INCR) coupled to the counter 14 execution unit 6 to select the increment method. The choice of increment method depends upon the type of information being measured, degree of counter resolution required, the bit-width of the counter, and the maximum required time quantum between reads of the counter.

An example increment method is to increment on processor clock cycles. An increment rate of 1 per processor clock cycle allows fully processor-cycle accurate count values to be obtained and is useful for providing extremely high-accuracy processor timestamp features, though in high speed systems the maximum time quantum is of the order of seconds (e.g. in a 1 GHz processor, a 32-bit timestamp counter would wrap within ~4 seconds and thus $DBGCNT should be read at least once every 4 seconds).

Another example increment method is to increment on divided processor clock cycles. An increment rate of a division (fixed or programmable) from the processor clock can provide less timestamp resolution, but a larger time quantum.

Another example increment method is to increment on non-processor clock cycles. An increment rate of a non-processor frequency (e.g. SoC frequency, or memory frequency) could provide sufficient accuracy and large range necessary for many tasks.

Another example increment method is to increment on processor stall cycles. An increment rate of 1 per process clock cycle when the processor is stalled for some reason (e.g. branch mispredict, cache miss etc.) is useful for obtaining high-accuracy information on how much the processor is stalled and thus not executing instructions at full speed.

Another example increment method is to increment on processor event cycles. An increment rate of 1 per processor clock cycle when the processor encounters a specified event (e.g. cache miss, cache hit, branch taken, branch not taken etc.) is useful for obtaining performance monitoring statistics.

A single instruction is used to read $DBGCNT (which might be an argument to the instruction e.g. a control-status register, or might be implicit in the instruction's opcode). For example:
   get $cDst, $DBGCNT
which will read the value of $DBCNT into the general purpose register $cDst.

Whenever the $DBGCNT register is read the value of the counter is reset to 0. Thus reading $DBGCNT returns the "delta value" since the last read.

This can be used for a variety of purposes, including measuring the time spent between arbitrary points in a program. Implementation of this feature is particularly simple as it is not necessary for the debugee to be aware of the previous timestamp value.

For example if the counter was not reset on each read the sequence to calculate time between two points would be:

```
unsigned int startCycle, endCycle, timeBetweenBAndA;
pointA:
    get startCycle, $DBGCNT
    ... arbitrary code ...
pointB:
    get endCycle, $DBGCNT
    timeBetweenBAndA = $endCycle - $startCycle
```

Whereas with $DBGCNT's zero on read mechanism it is simplified in that it does not require 3 variables values to be kept, and does not require a subtraction operation to calculate the number of cycles:

```
unsigned int startCycle, endCycle;
pointA:
    get endCycle, $DBGCNT
    # the above value will be discarded
    ... arbitrary code ...
pointB:
    get endCycle, $DBGCNT
    # the same register as the initial read will be reused
    .. and endCycle contains the time we've measured (i.e. no need for a
    subtraction instruction)
```

The $DBGCNT mechanism can be used to implement a variety of debugging and profiling features.

For example, a function-level profiling by code instrumentation. The compiler (or the linker, or the programmer) could insert code within the required functions to investigate its execution behaviour. Additional instructions placed in a function's prologue, could comprise:

```
get $cDst, $DBGCNT
dqm $cDST
```

Where the dqm instruction causes generation of NEXUS 5001-style DQM message on the debug port or to memory. This message would contain: the $PC of the dqm instruction to identify the function, and the $cDst value is the DQM data value and contains the time information.

Alternatively, rather than using dqm, the information could simply be stored in external memory using normal store instructions.

Similarly instructions can be placed within a function's epilog.

The debug tool will have visibility of entry and exit from instrumented functions and will be able to identify the program's call graph, and time spent in each function's invocation.

Another example is arbitrary profiling by code instrumentation. As per the example above, the additional instructions to read $DBGCNT and use its value could be inserted at arbitrary points in the program e.g. to measure the time between two arbitrary points or events.

In addition to the features above, extra features to control the debug mechanisms can be extended in order to provide "filtered" sequences during which debug trace is not generated. This allows threads, functions or sequences between arbitrary points in the program to be setup to not generate debug/trace information or timestamps.

It can be useful to limit the amount of information generated on the target's debug port (which is typically bandwidth limited compared to the target processor's ability to flood it with trace). It can also be useful to disable debug and trace information being generated in particular threads which might not be of interest. Additionally, it can be useful to "hide" debugging information which is not of interest, or is potentially non-deterministic due to interaction with some external peripherals which are not of interest. For example if debug tools are being used to perform profiling on a word-processing program it is not interesting or useful to observe time spent whilst waiting for a keypress to occur. In these circumstances it could be useful to simply "discard" any trace or timing between routines such as waitForKeypress( ) and gotKeypress( );

If the processor's debug control registers include a mechanism to filter debug information this can be used in conjunction with $DBGCNT.

For example, as mentioned, a register 15 ($DBGFILTER) could be provided to filter operation of the debug system. This could be a standalone register, or it could be a field in a thread's normal status register ($SR) and thus differ between threads in a multi-threaded RTOS based application as it would implicitly be thread-specific as part of a normal context switch operation.

If $DBGFILTER==0, debugging features operate normally, including timestamp instructions resetting the counter 14 in the normal manner as described above, and including the dqm instruction generating DQM information in its normal manner (either to memory or to a debug link).

If $DBGFILTER==1, debugging is filtered such that a timestamp instruction will not reset the counter 14, and the dqm instruction will not generate DQM information (it will simply be discarded rather than being generated to memory or to a debug link).

Thus if debugging/timestamping is not required in a certain thread it could simply execute with $DBGFILTER set to 1. Other thread(s) executing with $DBGFILTER as 0 will use $DBGCNT in the normal manner.

This allows the effect of a context-switch execution of another thread to not impact the debugging/profiling activities being performed on other thread(s). It also allows "non-debuggable" threads to execute the same instrumented code sections as "debuggable threads" without resetting the counter or generating DQM.

In addition to $DBGFILTER being specified as part of a thread's context, it could also be set to 0 or 1 at arbitrary points thus generating "non-traceable" sequences as required.

The filtering mechanism can also be used to prevent normal trace messages from being generated and thus avoid generating information of no interest or use to the debug tool, and to make best use of external debug link bandwidth.

It will be appreciated that the above embodiments have been described only by way of example. For instance, embodiments have been described in which the timestamp instruction reads the counter value to a destination register via a dedicated timestamp register 12, but it could alternatively read it to a general destination operand register, or in principle trigger an automatic transfer of the counter value to another storage location such as a RAM or data cache, either internal or external to the target processor. Embodiments have been described in which the timestamp is retrieved from the destination location by the debugging tool running on the target processor, but it could alternatively be retrieved by software running on the host or other external computer system. Further, embodiments have been described in relation to a host-target debug tool, but the idea of implicit resetting by a timestamp instruction can also be applied to a fully target-based debugging tool. Or both a target-based and host debugging tool could be used. Other applications and configurations may also be apparent to the person skilled in the art given the disclosure herein. The scope of the invention is not limited by the described embodiments.

The invention claimed is:

1. A computer-implemented method of debugging a target processor, the method comprising:
   executing a series of debug instructions on an execution unit of the target processor to generate trace information for debugging, wherein the series of debug instructions includes a plurality of timestamp instructions; and
   during execution of said series of debug instructions on the execution unit, periodically incrementing a value of a counter on the target processor; wherein said step of executing said series of debug instructions on the execution unit comprises:
   executing the plurality of timestamp instructions on the execution unit each to associate a respective timestamp with said trace information, wherein the step of executing each timestamp instruction comprises:
   fetching the time stamp instruction from a memory holding the series of debug instructions, wherein the time stamp instruction includes opcode;
   generating the respective time stamp by reading the value of the counter into a software accessible storage location designated by the opcode; and
   subsequently resetting the counter as a consequence of the opcode read from the time stamp instruction.

2. The method of claim 1, wherein the reading of the value into a storage location comprises reading the value from the counter into a timestamp register and subsequently reading the value from the timestamp register into a destination storage location.

3. The method according to claim 2, wherein the timestamp register is implicit in the timestamp instruction.

4. The method according to claim 1, further comprising for at least one of the timestamps: retrieving the timestamp from the storage location, and supplying the retrieved timestamp or information based thereon to a debugging tool.

5. The method according to claim 4, wherein the step of supplying comprises supplying the retrieved timestamp or information based thereon from the target processor to a host debugging tool running an external computer system.

6. The method according to claim 4, wherein the step of supplying comprises supplying the retrieved timestamp or information based thereon to a target-based debugging tool running on the target processor itself.

7. The method according to claim 4, wherein said retrieval of the timestamp is performed by software executed on the target processor.

8. The method of claim 5, comprising processing said timestamp in software executed on the target processor to generate said information based thereon, wherein the step of supplying comprises supplying said information to the host debugging tool.

9. The method according to claim 1, comprising compressing the timestamp by omitting leading zeros.

10. The method of claim 1, comprising filtering one or more timestamp instructions by selecting a mode of operation of the processor in which timestamp instructions do not reset the counter.

11. The method of claim 1, comprising using the timestamp as a measure of one of: a time between arbitrary specified points in said code, a time spent in a function of said code, a time spent executing each of a plurality of threads in said code, and a time spent when idle.

12. A processor for generating debugging timestamps, the processor comprising:
   a program memory;
   an execution unit operatively coupled to said program memory, arranged to execute a series of debug instructions fetched from said memory to generate trace information for debugging;
   a counter operatively coupled to the execution unit, arranged to periodically increment during execution of said series of debug instructions; and
   a software-accessible storage location operatively coupled to the execution unit;
   wherein the execution unit is configured to, upon execution of each one of a plurality of timestamp instructions in said series of debug instructions:
   fetch a time stamp instruction from the memory, wherein the time stamp instruction includes opcode;
   generate the respective time stamp by reading a value of the counter into the software-accessible storage location designated by the opcode; and
   subsequently reset the counter as a consequence of the opcode read from the time stamp instruction.

13. The processor of claim 12, wherein the execution unit is configured to read the value into a storage location by reading the value from the counter into a timestamp register and subsequently reading the value from the timestamp register into a destination storage location.

14. The processor of claim 13, wherein the execution unit is configured such that the timestamp register is implicit in the timestamp instruction.

15. The processor of claim 12, wherein the processor is programmed to, for at least one of the timestamps: retrieve the timestamp from the storage location, and supply the retrieved timestamp or information based thereon to a debugging tool.

16. The processor of claim 15, wherein the processor comprises a port, and is arranged to supply the retrieved timestamp or information based thereon from the target processor via the port to a host debugging tool running an external computer system.

17. The processor of claim 16, wherein the processor is programmed to process said timestamp to generate said information based thereon, and supply said information to the host debugging tool.

18. The processor of claim 15, wherein the processor is programmed to supply the retrieved timestamp or information based thereon to a target-based debugging tool running on the target processor itself.

19. The processor of claim 12, comprising filtering circuitry operable set the execution unit into a mode of operation in which timestamp instructions do not reset the counter.

20. A debugging system comprising the processor of claim 12, and a debugging tool configured to use the timestamp as a measure of one of:
 a time between arbitrary specified points in said code, a time spent in a function of said code, a time spent executing each of a plurality of threads in said code, and
 a time spent when idle.

21. A user equipment comprising a processor for generating debugging timestamps, the processor comprising:
 a program memory;
 an execution unit operatively coupled to said program memory, arranged to execute a series of debug instructions fetched from said memory to generate trace information for debugging;
 a counter operatively coupled to the execution unit, arranged to periodically increment during execution of said series of debug instructions; and
 a software-accessible storage location operatively coupled to the execution unit;
 wherein the execution unit is configured to, upon execution of each one of a plurality of timestamp instructions in said series of debug instructions:
  fetch a time stamp instruction from the memory, wherein the time stamp instruction includes opcode;
  generate the respective time stamp by reading a value of the counter into the software-accessible storage location designated by the opcode; and
  subsequently reset the counter as a consequence of the opcode read from the time stamp instruction.

22. A mobile terminal comprising a processor for generating debugging timestamps, the processor comprising:
 a program memory;
 an execution unit operatively coupled to said program memory, arranged to execute a series of debug instructions fetched from said memory to generate trace information for debugging;
 a counter operatively coupled to the execution unit, arranged to periodically increment during execution of said series of debug instructions; and
 a software-accessible storage location operatively coupled to the execution unit;
 wherein the execution unit is configured to, upon execution of each one of a plurality of timestamp instructions in said series of debug instructions:
  fetch a time stamp instruction from the memory, wherein the time stamp instruction includes opcode;
  generate the respective time stamp by reading a value of the counter into the software-accessible storage location designated by the opcode; and
  subsequently reset the counter as a consequence of the opcode read from the time stamp instruction.

23. A set-top box comprising a processor for generating debugging timestamps, the processor comprising:
 a program memory;
 an execution unit operatively coupled to said program memory, arranged to execute a series of debug instruction fetched from said memory to generate trace information for debugging;
 a counter operatively coupled to the execution unit, arranged to periodically increment during execution of said series of debug instructions; and
 a software-accessible storage location operatively coupled to the execution unit;
 wherein the execution unit is configured to, upon execution of each one of a plurality of timestamp instructions in said series of debug instructions:
  fetch a time stamp instruction from the memory, wherein the time stamp instruction includes opcode;
  generate the respective time stamp by reading a value of the counter into the software-accessible storage location designated by the opcode; and
  subsequently reset the counter as a consequence of the opcode read from the time stamp instruction.

24. An engine management system comprising a processor for generating debugging timestamps, the processor comprising:
 a program memory;
 an execution unit operatively coupled to said program memory, arranged to execute a series of debug instructions fetched from said memory to generate trace information for debugging;
 a counter operatively coupled to the execution unit, arranged to periodically increment during execution of said series of debug instructions; and
 a software-accessible storage location operatively coupled to the execution unit;
 wherein the execution unit is configured to, upon execution of each one of a plurality of timestamp instructions in said series of debug instructions:
  fetch a time stamp instruction from the memory, wherein the time stamp instruction includes opcode;
  generate the respective time stamp by reading a value of the counter into the software-accessible storage location designated by the opcode; and
  subsequently reset the counter as a consequence of the opcode read from the time stamp instruction.

\* \* \* \* \*